(12) United States Patent
Duan (10) Patent No.: US 11,144,720 B2
(45) Date of Patent: Oct. 12, 2021

(54) DETERMINING CANONICAL CONTENT FOR A GAME

(71) Applicant: Roblox Corporation, San Mateo, CA (US)

(72) Inventor: Jianan Duan, Foster City, CA (US)

(73) Assignee: Roblox Corporation, San Mateo, CA (US)

(*) Notice: Subject to any disclaimer, the term of this patent is extended or adjusted under 35 U.S.C. 154(b) by 129 days.

(21) Appl. No.: 16/551,396

(22) Filed: Aug. 26, 2019

(65) Prior Publication Data

US 2021/0064696 A1 Mar. 4, 2021

(51) Int. Cl.
| | |
|---|---|
| *G06F 17/00* | (2019.01) |
| *G06F 40/232* | (2020.01) |
| *G06F 16/36* | (2019.01) |
| *A63F 13/63* | (2014.01) |
| *G06F 40/258* | (2020.01) |

(52) U.S. Cl.
CPC .......... *G06F 40/232* (2020.01); *A63F 13/63* (2014.09); *G06F 16/367* (2019.01); *G06F 40/258* (2020.01)

(58) Field of Classification Search
CPC .... G06F 40/232; G06F 16/367; G06F 40/258; A63F 13/63
See application file for complete search history.

(56) References Cited

U.S. PATENT DOCUMENTS

| | | | |
|---|---|---|---|
| 8,352,465 B1 | 1/2013 | Jing | |
| 9,032,392 B2* | 5/2015 | Glover | G06F 16/3334 |
| | | | 717/176 |
| 9,432,395 B2* | 8/2016 | Glover | H04L 67/02 |
| 9,471,624 B1* | 10/2016 | Patil | G06F 16/24 |
| 9,519,726 B2* | 12/2016 | Kumar | G06F 8/61 |
| 9,553,919 B2* | 1/2017 | Shapira | G06F 16/958 |
| 9,569,536 B2* | 2/2017 | Ronen | G06F 16/951 |
| 9,619,574 B2* | 4/2017 | Shapira | G06F 8/61 |
| 9,626,443 B2* | 4/2017 | Fan | G06F 8/61 |
| 9,703,882 B2* | 7/2017 | Shapira | G06F 40/134 |
| 9,720,672 B2* | 8/2017 | Lipton | G06F 9/445 |
| 9,721,021 B2* | 8/2017 | Klotz | G06F 16/9535 |
| 9,946,766 B2* | 4/2018 | Wise | G06F 16/951 |
| 10,108,715 B2* | 10/2018 | Desineni | G06F 16/345 |
| 10,157,232 B2* | 12/2018 | Dai | H04L 67/306 |
| 10,216,852 B1* | 2/2019 | Gupta | G06F 16/951 |

(Continued)

OTHER PUBLICATIONS

WIPO, International Search Report for International Patent Application No. PCT/US2019/051563, dated Nov. 19, 2019, 3 pages.

(Continued)

*Primary Examiner* — Mohammed H Zuberi (74) *Attorney, Agent, or Firm* — IP Spring (57) ABSTRACT

A method to determine a canonical title. The method includes identifying an original title for an original game. The method further includes removing from respective titles for a plurality of other games at least one of punctuation, one or more special characters, and emojis to determine corresponding canonical titles. The method further includes identifying a subset of canonical titles from the corresponding canonical titles that exceed a threshold similarity as compared to the original title. The method further includes associating an original history associated with the original game with the subset of canonical titles.

20 Claims, 4 Drawing Sheets

(56) References Cited

U.S. PATENT DOCUMENTS

| | | | |
|---|---|---|---|
| 10,417,612 B2* | 9/2019 | Gehrke | G06Q 10/101 |
| 10,558,715 B2* | 2/2020 | Chernenkov | G06F 16/9566 |
| 10,635,725 B2* | 4/2020 | Samdani | G06F 16/24534 |
| 10,942,836 B2* | 3/2021 | Patil | G06Q 30/0601 |
| 2010/0041475 A1* | 2/2010 | Zalewski | A63F 13/5375 |
| | | | 463/30 |
| 2013/0290344 A1 | 10/2013 | Glover et al. | |
| 2016/0188730 A1 | 6/2016 | Santi et al. | |
| 2016/0350283 A1 | 12/2016 | Carus et al. | |

OTHER PUBLICATIONS

WIPO, Written Opinion for International Patent Application No. PCT/US2019/051563, dated Nov. 19, 2019, 6 pages.

* cited by examiner

DETERMINING CANONICAL CONTENT FOR A GAME

TECHNICAL FIELD

Embodiments relate generally to computer-based gaming, and more particularly, to methods, systems, and computer readable media for determining canonical content for a computer-enabled game.

BACKGROUND

Gaming platforms provide building blocks (characters, clothing, accessories, environments, objects, physics engines, etc.) that enable users to build their own games. Different users build different types of games, such as puzzles, mysteries, racing, maintaining a garden, etc., out of these building blocks. Other users can join a game, for example, by joining an ongoing instance of a multiplayer game, playing the game in single player mode, etc.

Users provide their own titles for the games. One problem with user-generated titles is that they may modify an original title to be inaccurate. As a result, the search engine may return the wrong search results due to string match inaccuracy.

The gaming platform provides search features that allow users to search for available games. The gaming platform also provides ranked lists of games, such as top earning games, popular games, trending games, etc. It is important that the search engine be able to return relevant games and remove non-relevant games in response to a user query. Game titles within such variants can cause the search engine to not identify the most relevant matches accurately.

SUMMARY

Embodiments generally relate to a method to determine canonical titles. The method includes identifying an original title for an original game. The method further includes removing from respective titles for a plurality of other games at least one of punctuation, one or more special characters, and emojis to determine corresponding canonical titles. The method further includes identifying a subset of canonical titles from the corresponding canonical titles that exceed a threshold similarity as compared to the original title. The method further includes associating an original history associated with the original game with the subset of canonical titles.

In some embodiments, the method further includes associating a new history with each remaining canonical title that fails to exceed the threshold similarity as compared to the original title. In some embodiments, the method further includes generating the original history for the original game, wherein the original history includes at least one of a description of the original game, a creation date of the original game, a number of times the original game was played, an identity of users that played the original game, and when the users played the original game. In some embodiments, the method further includes identifying a keyword from the respective titles and removing the keyword from the respective titles, wherein the keyword is descriptive of a holiday. In some embodiments, the method further includes identifying a keyword from the respective titles and removing the keyword from the respective titles, wherein the keyword matches at least one of beta, test, release, edition, and update. In some embodiments, the method further des receiving one or more search terms from a user, determining a score based on a comparison between (1) the original title and the one or more search terms and (2) the corresponding canonical titles and the one or more search terms, and providing a response to the user, wherein the response includes the original title and one or more of the corresponding canonical titles along with corresponding scores that indicate a level of match between (1) the original title and the one or more search terms and (2) each of the corresponding canonical titles and the search tears. In sore embodiments, the score is based on an ontology string comparison. In some embodiments, the original title is provided as a top result and the one or more of the corresponding canonical titles are presented as other results. In some embodiments, processing the respective titles further includes receiving a keyword from a user, identifying the keyword in the respective titles, and removing the keyword from the respective titles.

In some embodiments, non-transitory computer-readable medium with instructions stored thereon that, when executed by one or more computers, cause the one or more computers to perform operations, the operations comprising: identifying original content for an original game, removing from respective content for a plurality of other games at least one of punctuation, one or more special characters, and emojis to determine corresponding canonical content, identifying a subset of canonical content from the corresponding canonical content that exceed a threshold similarity as compared to the original content, and associating an original history associated with the original game with the subset of canonical content.

In some embodiments, the operations further comprise associating a new history with each remaining cononical content that fails to exceed the threshold similarity as compared to the original content. In some embodiments, the operations further comprise generating the original history for the original game, wherein the original history includes at least one of a description of the original game, a creation date of the original game, a number of times the original game was played, an identity of users that played the original game, when the users played the original game, and a thumbnail of the original game. In some embodiments, the operations further comprise identifying a keyword from the respective content and removing the keyword from the respective content, wherein the keyword is descriptive of a holiday. In some embodiments, the operations further comprise identifying a keyword from the respective content and removing the keyword from the respective content, wherein the keyword matches at least one of beta, test, release, edition, and update. In some embodiments, the original content is an original title, the respective content is respective titles, and canonical content is canonical titles.

In some embodiments, a system comprises one or more processors and a memory that stores instructions that, when executed by the one or more processors cause the one or more processors to perform operations comprising: identifying an original title for an original game, removing from respective titles for a plurality of other games at least one of punctuation, one or more special characters, and emojis to determine corresponding canonical titles, identifying a subset of canonical titles from the corresponding canonical titles that exceed a threshold similarity as compared to the original title, and associating an original history associated with the original game with the subset of canonical titles.

In some embodiments, the operations further comprise associating a new history with each remaining canonical title that fails to exceed the threshold similarity as compared to the original title. In some embodiments, the operations further comprise generating the original history for the original game, wherein the original history includes at least one of a description of the original game, a creation date of the original game, a number of times the original game was played, an identity of users that played the original game, and when the users played the original game. In some embodiments, the operations further comprise identifying a keyword from the respective titles and removing the keyword from the respective titles, wherein the keyword is descriptive of a holiday. In some embodiments, the operations further comprise identifying a keyword from the respective titles and removing the keyword from the respective titles wherein the keyword matches at least one of beta, test, release, edition, and update.

The various embodiments described below advantageously identify a canonical title of a game by removing at least one of punctuation, one or more special characters, and emojis from the respective titles. The canonical title is used to determine that another game is similar enough to an original game to be associated with the same history. The canonical title is also advantageously used to return better search results when users search for games. Furthermore, although the specifications written with a game as a primary embodiment, persons of ordinary skill in the art will recognize that this could apply to any application such that a canonical title for any type of application is determined.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users of the platform to create and animate new characters and avatars. For example, users of the online gaming platform may be enabled to create, design, and customize new characters.

In some embodiments, animation may include characters that move one or more body parts to simulate movement such as walking, running, jumping, dancing, fighting, wielding a weapon such as a sword, etc. In some embodiments, characters may generate facial expressions, where a part of or an entire body of the character moves. Animations may correspond to various movements, e.g. graceful, warrior-like, balletic, etc., and may mimic the movement of popular real and fictional characters.

Example System

Figure 1:
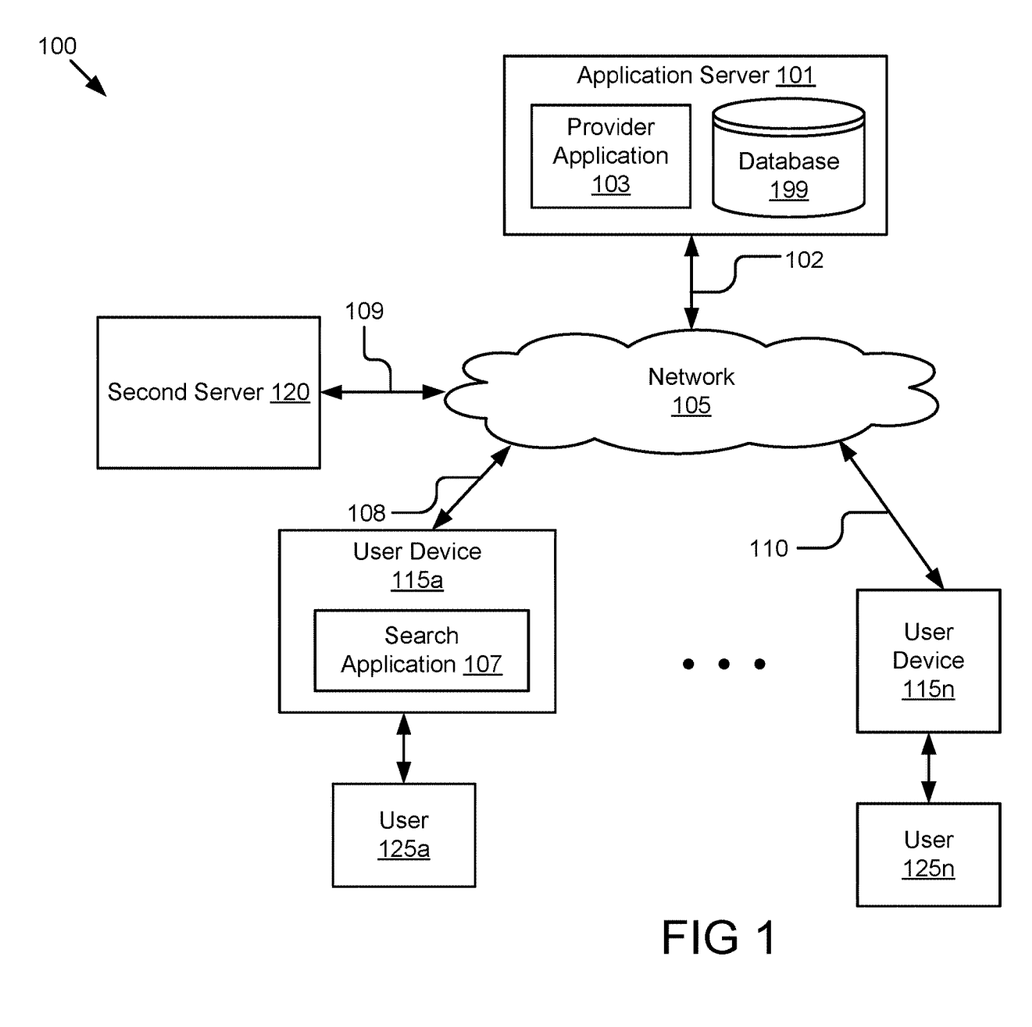
FIG. 1 illustrates a block diagram of an example system that determines canonical content according to some embodiments.

FIG. 1 illustrates a block diagram of an example system 100 that determines canonical content. The illustrated system 100 includes an application server 101, user devices 115a, 115n, a second server 120, and a network 105. Although the system 100 is illustrated as having one application server 101, multiple user devices 115, one second server 120, and one network 105, in some embodiments, the system 100 has one or more application servers 101, one or more user devices 115, one or more second servers 120, and one or more networks 105. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The application server 101 can include a server having one or more computing devices (e.g., a cloud computing system, a rackmount server, a server computer, cluster of physical servers, etc.). In some embodiments, the application server 101 may be an independent system, may include multiple servers, or be part of another system or server.

In some embodiments, the application server 101 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the application server 101 and to provide a user with access to the application server 101. The application server 101 may also include a website (e.g., a webpage) or application back-end software that may be used to provide a user with access to content provided by the application server 101. For example, users may access the application server 101 using the search application 107 on the user device 115.

The application server 101 may be a virtual gaming server that stores games and provides a platform for providing the games to users. In some embodiments, games (also referred to as "video game," "online game," or "virtual game" herein) may be two-dimensional (2D) games, three-dimensional (3D) games (e.g., 3D user-generated games), virtual reality (VR) games, or augmented reality (AR) games. In some embodiments, users may participate in gameplay with other users. In some embodiments, a game may be played in real-time with other users of the game.

The application server 101 includes a processor, a memory, and network communication capabilities. In some embodiments, the application server 101 is a hardware server. The application server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the application server 101 sends and receives data to and from one or more of the user devices 115a, 115n and the second server 120 via the network 105. The application server 101 may include a provider application 103 and a database 199.

The application server 101 includes a provider application 103 that stores the games, receives search terms from users, and provides matching games to the users. The provider application 103 may be code and routines operable to determine canonical content. In some embodiments, the provider application 103 may be implemented using hardware including a field-programmable gate array (FPGA) or an application-specific integrated circuit (ASIC). In some embodiments, the provider application 103 may be implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers).

The database 199 may store games, histories, and canonical content, such as titles. The histories may include a description of a game, a creation date of the game, a number of times the game was played, an identity of users that played the game, when the users played the game, a thumbnail image of the game, etc. The database 199 may also store social network data associated with users 125, such as user profiles, games that a user has downloaded and/or played, connections between users 125, user preferences, etc.

The user device 115 may be a computing device that includes a memory, a hardware processor, and a search application 107. For example, the user device 115 may include a desktop computer, a laptop, a mobile device, a tablet computer, a mobile telephone, a wearable device, a head-mounted display, a mobile email device, a portable game player, a portable music player, a reader device, or another electronic device capable of accessing a network 105. Users 125a, 125n may be associated with respective user devices 115a, 115n.

In the illustrated embodiment, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the search application 107 receives information from the provider application 103. In some embodiments, the search application 107 is a component of the provider application 103. For example, the search application 107 may receive search terms from the user 125 and the provider application 103 may provide the search terms to the search application 107, which displays the search results. In some embodiments, the search application 107 is a browser that communicates with the provider application 103.

The second server 120 may include a processor, a memory, and network communication capabilities. The second server 120 may access the network 105 via signal line 109. The second server 120 may include an application that generates games and that submits the games to the application server 101.

In the illustrated embodiment, the entities of the system 100 are communicatively coupled via a network 105. The network 105 may be a conventional type, wired or wireless, and may have numerous different configurations including a star configuration, token ring configuration or other configurations. Furthermore, the network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof. Although FIG. 1 illustrates one network 105 coupled to the user devices 115 and the application server 101, in practice one or more networks 105 may be coupled to these entities.

Example Computing Device

Figure 2:
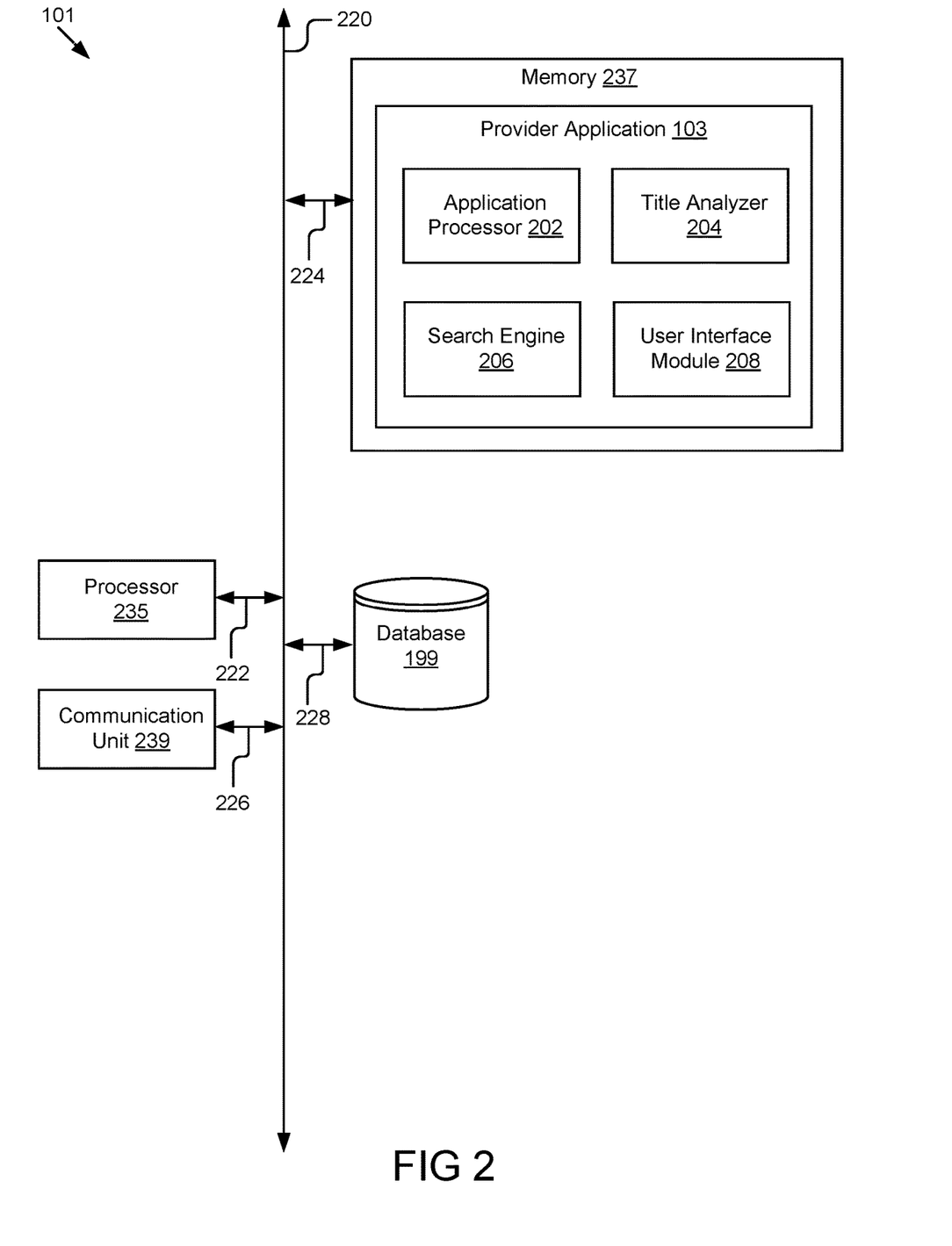
FIG. 2 illustrates a block diagram of an example computing device that determines canonical content according to some embodiments.

FIG. 2 illustrates a block diagram of an example application server 101 that determines canonical content. The application server 101 may include a processor 235, a memory 237, a communication unit 239, and a database 199. Additional components may be present or some of the previous components may be omitted depending on the type of application server 101. For example, the application server 101 may include a battery. A provider application 103 may be stored in the memory 237. In some embodiments, some or all of the components of the provider application 103 are stored on the user device 115 as part of the search application 107. The components of the application server 101 may be communicatively coupled by a bus 220.

The processor 235 includes an arithmetic logic unit, a microprocessor, a general-purpose controller, or some other processor array to perform computations and provide instructions to a display device. The processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the application server 101. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the provider application 103, which is described in greater detail below. The memory 237 is coupled to the bus 220 for communication with the other components via signal line 224.

The communication unit 239 transmits and receives data from and transmits data to at least one of the user devices 115 and the second server 120. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the application server 101. In some embodiments, the communication unit 239 includes a wireless transceiver for exchanging data with the user device 115, second server 120, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), etc.

The database 199 may be a non-transitory computer-readable storage medium that stores data that provides the functionality described herein. The database 199 may be a DRAM device, a SRAM device, flash memory or some other memory device. In some embodiments, the database 199 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The database 199 is coupled to the bus 220 for communication with the other components via signal line 228.

The provider application 103 may include an application processor 202, a content analyzer 204, a search engine 206, and a user interface module 208.

The application processor 202 receives an application and processes the application. In some embodiments, the application processor 202 includes a set of instructions executable by the processor 235 to process the application. In some embodiments, the application processor 202 is stored in the memory 237 of the application server 101 and can be accessible and executable by the processor 235.

In some embodiments, the application processor 202 processes an application by identifying content for an original application. The content may include a title or anything with a time series of changes, such as a description. The application may be any type of streamable or downloadable electronic application, such as a game, a social network application, a business application, a word-processing application, etc. The application processor 202 may identify an original title for an original game by receiving a game, for example, from a second server 120, determining whether it is the first instance of that type of game, and determining the original title based on the game being the original game. For example, where the game is called "Sun City," the application processor 202 may determine whether other games exist with the name "Sun City" and, if not, identify "Sun City" as the original title.

In some embodiments, the application processor 202 may also determine whether an application is an original application by instructing the content analyzer 204 to determine a canonical title for the game and determine whether there are other games with canonical titles that are similar that were submitted earlier. For example, the application processor 202 may determine that the canonical title for the game is "Sun City Update" and that there is an earlier version of the game that is titled "Sun City." In this example, the application processor 202 determines that "Sun City Update" is not the original title for the game because an earlier version of the game exists.

The application processor 202 may generate a history for an original title. The history may include a description of a game, a creation date of the game, a number of times the game was played, an identity of users that played the game, when the users played the game, etc. The application processor 202 may update the history each time a parameter changes. For example, the application processor 202 may update the history each time a user plays the game.

The content analyzer 204 determines canonical content for a plurality of other games and a subset of content that exceed a threshold similarity as compared to the original content. In some embodiments, the content analyzer 204 includes a set of instructions executable by the processor 235 to determine the canonical content and compare similarities between content. In some embodiments, the content analyzer 204 is stored in the memory 237 of the application server 101 and can be accessible and executable by the processor 235.

The content analyzer 204 may receive applications with similar content. For example, users may append or modify an original title to include new release, updated game, Easter special, etc. The content analyzer 204 may process respective titles for a plurality of other applications to determine canonical titles by removing at least one of punctuation, one or more special characters, and emojis from the respective titles. For example, the content analyzer 204 may process "robot army ☺" to remove the emoji, "r_o_b_o_t_a_r_m_y" to remove the underscore, and "robot's army" to remove the apostrophe and s such that all three examples have the canonical title "robot army." The content analyzer 204 may process "robot army 2&*(" and determine that the canonical title is "robot army 2." Although the above example is for a title, the process applies similarly to descriptions.

In some embodiments, the content analyzer 204 processes the respective content by identifying a keyword from the set of content and removing the keyword. For example, the content analyzer 204 may identify a keyword from the set of titles and remove the title. The keyword may include a holiday, such as Easter, Christmas, Thanksgiving, New Year's, St. Patrick's Day, Valentine's Day, Father's Day, Mother's Day, Labor Day, Diwali, Hanukkah, Chinese New Year, Independent Day, Republic Day, etc. The keywords may also include seasons, such as "spring special;" character types or names, such as "underwater treasure," "Nemo," "Underwater Treasure—Dory;" vehicle type, such as "Derby Racing—Truck Edition," "Derby Racing—Bike Edition," "Derby Racing—SUV." The keyword may also include an abbreviation of a holiday term, such as Xmas for Christmas, or an expanded phrase, such as New Year's Day for New Year's.

The keyword may include a word that matches at least one of beta, test, release, edition, and update. For example, the content analyzer 204 may process the title "robot my update" to have the canonical title "robot army." In another example, the content analyzer 204 may process "Dance Marathon Xmas Special" to remove "Xmas Special." In some embodiments, a user may provide additional keywords via a user interface generated by the user interface module 208 described in detail below.

In some embodiments, the content analyzer 204 identifies keywords in different languages. For example, the content analyzer 204 may recognize that Christmas in English is the same as Weihnachten in German and would exclude either word from the canonical title.

After the processing, the content analyzer 204 may identify from the canonical titles, whether a subset of titles exceed a threshold similarity as compared to the original title. In some embodiments, the content analyzer 204 may determine that the threshold similarity is 70% based on a character-to-character comparison. Continuing with the example above, the content analyzer 204 determines that "robot army ☺," "r_o_b_o_ta_r_m_y," "robot's army," "robot army 2&*," and "robot army update" are all within the threshold similarity. The content analyzer 204 may determine that "Robot Army Armageddon" is not within the threshold similarity because the canonical title "Robot Army Armageddon" is only 50% similar to the original title "robot army."

If the content analyzer 204 determines that the subset of titles exceed a threshold similarity as compared to the original title, the content analyzer 204 may associate a history associated with the game to the subset of titles. This way, if a user plays one of the games from the subset of s the history will be updated to reflect that the user played the game. If the content analyzer 204 determines that the subset of titles fails to exceed the threshold similarity as compared to the original title, the content analyzer 204 associates a new history with each of the remaining canonical titles.

In some embodiments, once the canonical content is determined for an application, the provider application 103 makes the application available to users. For example, the content analyzer 204 may instruct the user interface module 208 to update a user interface to provide an option for accessing the application, for example, through streaming or downloading the application.

The search engine 206 receives search terms from a user and identifies matching content from the original content and the canonical content. In some embodiments, the search engine 206 includes a set of instructions executable by the processor 235 to identify matching content. In some embodiments, the search engine 206 is stored in the memory 237 of the application server 101 and can be accessible and executable by the processor 235.

In some embodiments, the search engine 206 receives one or more search terms from a user. For example, the search engine 206 receives the search terms "robot armies." The search engine 206 determines a score based on a comparison between (1) the original title and the one or more search terms and (2) the canonical titles and the one or more search terms. Continuing with the example, the search engine 206 determines the score for "robot armies" as compared to the original title "robot army" and the canonical titles "robot army," "robot army," "robot army 2," and "robot army." The search engine 206 may determine the score based on an ontology string comparison.

The search engine 206 provides the original title and the canonical titles along with corresponding scores that indicate a level of match between (1) the original title and the one or more search terms and (2) the canonical title and the one or more search terms. In some embodiments, the original title is provided as a top result and the canonical titles are presented as lower matches.

The user interface module 208 generates graphical data for displaying a user interface. In some embodiments, the user interface module 208 includes a set of instructions executable by the processor 235 to generate the graphical data. In some embodiments, the user interface module 208 is stored in the memory 237 of the application server 101 and can be accessible and executable by the processor 235.

In some embodiments, the user interface module 208 generates graphical data for displaying a user interface for a user to search for applications and access the applications. The user interface module 208 may instruct the communication unit 239 to transmit the graphical data to the search application 107 on the user device 115 for display. After the user provides search terms to the search engine 206, the user interface module 208 may generate graphical data for displaying the user interface with updated search results.

Figure 3:
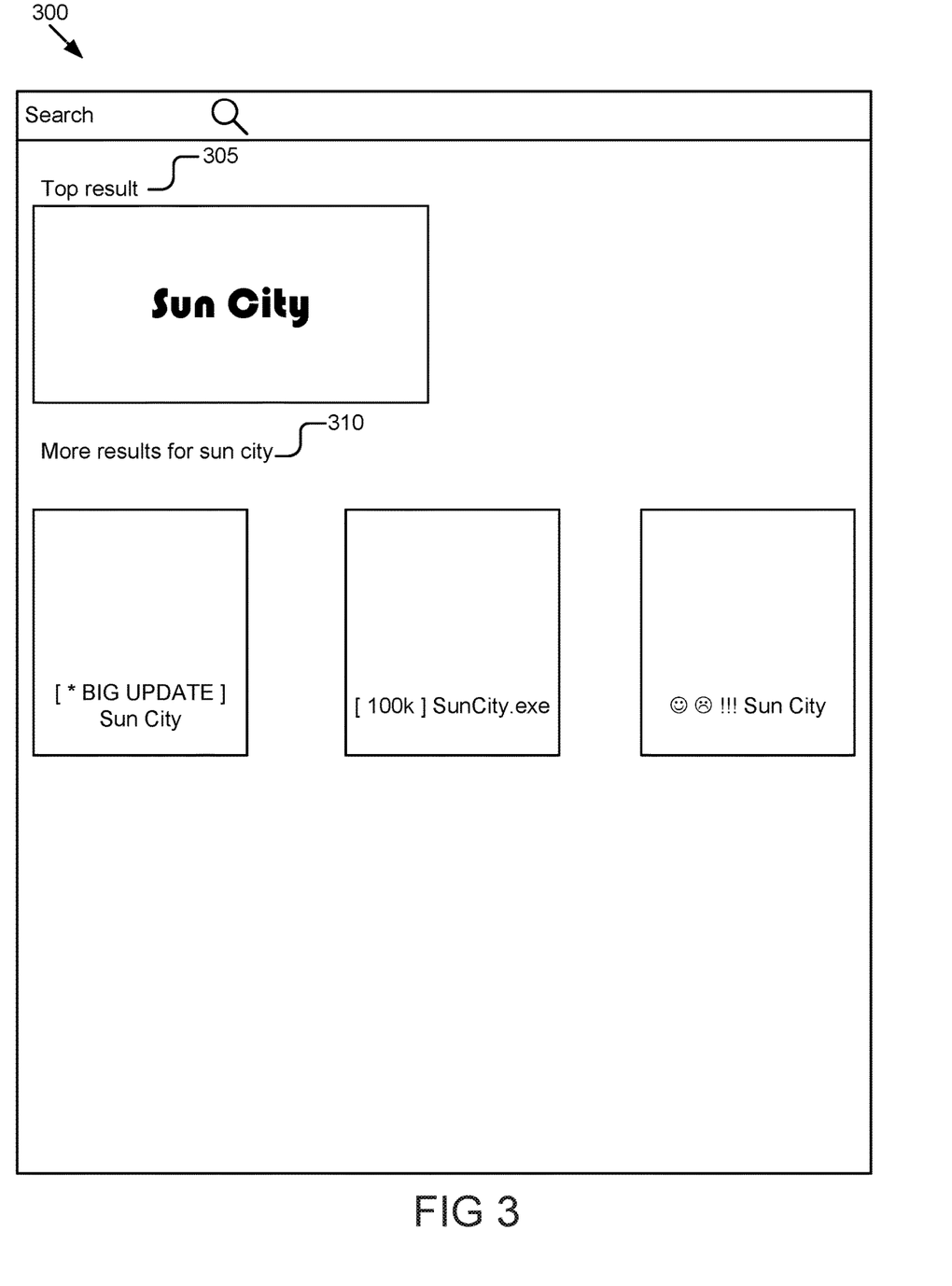
FIG. 3 illustrates an example user interface that includes search results organized based on determining canonical content according to some embodiments.

FIG. 3 illustrates an example user interface 300 that includes search results organized based on determining canonical titles according to some embodiments. In this example, a user searched for "sun city" and the user interface module 208 generated graphical data to present search results for applications identified by the search engine 206. In some embodiments, selecting one of the applications results in the application server 101 streaming a game to the user or making a game available for download. The search results include a top result 305 that is an example where the original game was identified and presented as the top result. The search results also include more results for sun city 310. Specifically, the additional results include a "[* BIG UPDATE] Sun City" that the content analyzer 204 determined has the canonical title of "[ ] Sun City," "[100k] SunCity.exe" that the content analyzer 204 determined has the canonical title of "[100k] SunCity.exe," and "☺☺!!! Sun City" that the title analyzer determined has the canonical title of "Sun City."

In some embodiments, the user interface module 208 may generate graphical data for displaying a user interface to a user of the provider application 103 with options for configuring the provider application 103. For example, the user interface module 208 may generate a user interface for adding to a list of keywords to be excluded from canonical titles.

Example Method

Figure 4:
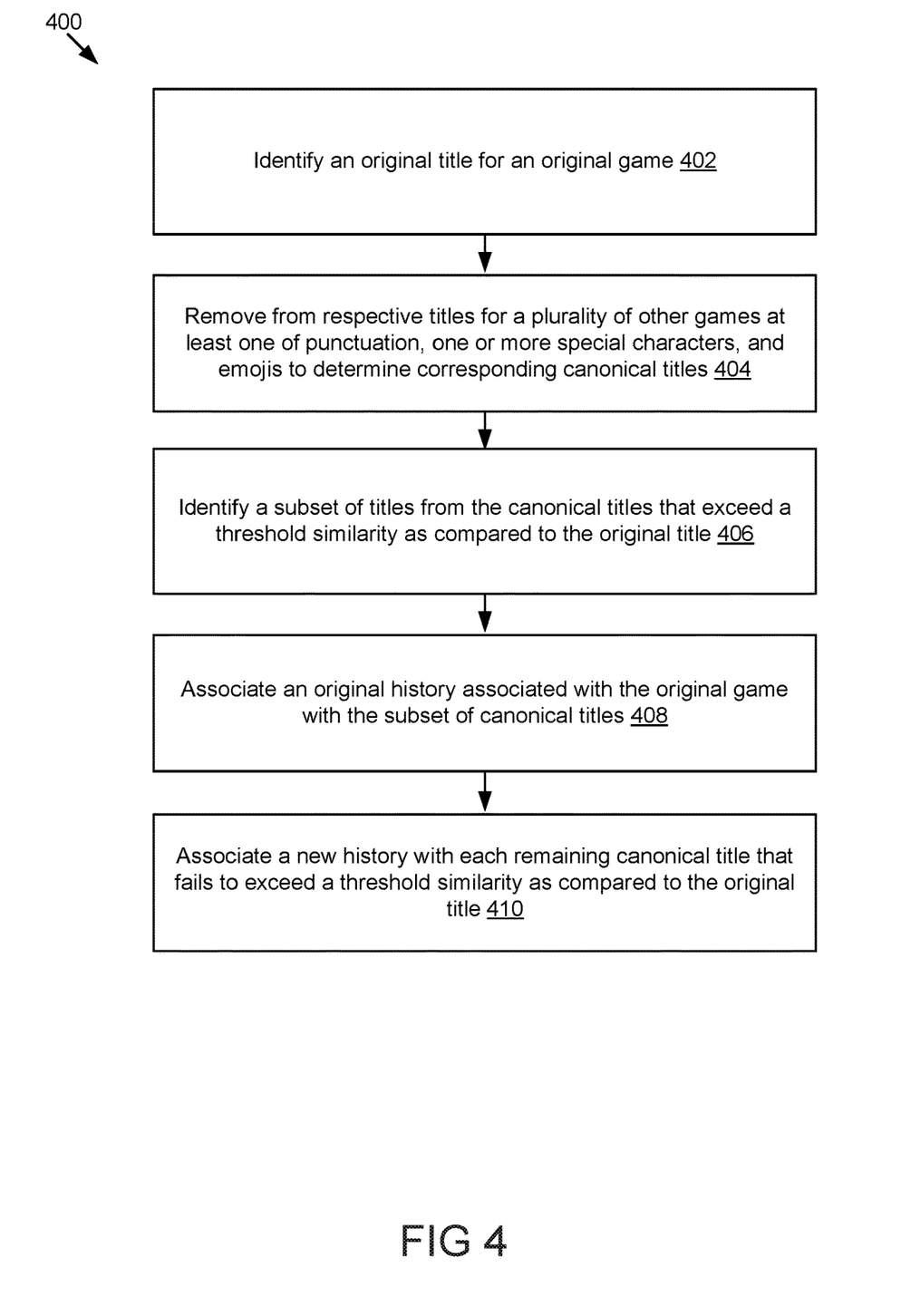
FIG. 4 illustrates a flowchart of an example method to determine canonical content according to some embodiments.

FIG. 4 illustrates a flowchart of an example method 400 to determine canonical titles according to some embodiments. The method 400 is performed by a provider application 103 stored on an application server 101.

At block 402, an original title for an original game is identified. For example, the earliest use of a title is determined to be the original title. Block 402 may be followed by block 404.

At block 404, for respective titles for a plurality of other games at least one of punctuation, one special characters, and emojis are removed to determine corresponding canonical titles. For example, the provider application 103 removes "." and "☺" from the respective titles. Block 404 may be followed by block 406.

At block 406, a subset of titles are identified from the canonical titles are identified that exceed a threshold similarity as compared to the original title. For example, the subset of titles may be at least 70% similar to the original title. Block 406 may be followed by block 408.

At block 408, an original history associated with the original game is associated with the subset of canonical titles. Block 408 may be followed by block 410.

At block 410, a new history is associated with each remaining canonical title that fails to exceed a threshold similarity as compared to the original title.

One or more of the blocks may be performed in parallel or may be combined with other blocks. For example, blocks 408 and 410 may be performed in parallel, or may be combined.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or s personal information, the systems provide users with an opportunity to control whether programs or features collect user information (e.g., information about a user's social network, social actions or activities, profession, a user's preferences, or a user's current location), or control whether and/or how to receive content from the server that nay be more relevant to the user. In addition, certain data may be treated in one or more ways before its stored or used, so that personally identifiable information is removed. For example, a user's identity nay be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A method comprising:

identifying an original title for an original game;

removing from respective titles for a plurality of other games at least one of punctuation, one or more special characters, and emojis to determine corresponding canonical titles;

identifying a subset of canonical titles from the corresponding canonical titles that exceed a threshold similarity as compared to the original title;

associating an original history associated with the original game with the subset of canonical titles;

receiving one or more search terms from a user device;

determining a first score based on comparing (1) the original title and the one or more search terms and a second score based on comparing (2) the corresponding canonical titles and the one or more search terms; and providing a response to the user device, wherein the response includes the original title and one or more of the corresponding canonical titles along with corresponding first scores and corresponding second scores that indicate a level of match between (1) the original title and the one or more search terms and (2) each of the corresponding canonical titles and the one or more search terms, and wherein the original title is provided as a top result and the one or more of the corresponding canonical titles are presented as other results.

2. The method of claim 1, further comprising:
associating a new history with each remaining canonical title that fails to exceed the threshold similarity as compared to the original title.

3. The method of claim 1, further comprising:
generating the original history for the original game, wherein the original history includes at least one of a description of the original game, a creation date of the original game, a number of times the original game was played, an identity of users that played the original game, when the users played the original game, or a thumbnail of the original game.

4. The method of claim 1, further comprising:
identifying a keyword from the respective titles and removing the keyword from the respective titles, wherein the keyword is descriptive of a holiday.

5. The method of claim 1, further comprising:
identifying a keyword from the respective titles and removing the keyword from the respective titles, wherein the keyword matches at least one of beta, test, release, edition, or update.

6. The method of claim 1, wherein the original title and the one or more of the corresponding canonical titles are presented as a list with the original title at a top of the list.

7. The method of claim 1, wherein determining the first score and the second score is based on an ontology string comparison.

8. The method of claim 1, wherein the threshold similarity is a percentage.

9. The method of claim 1, wherein processing the respective titles further includes receiving a keyword from the user device, identifying the keyword in the respective titles, and removing the keyword from the respective titles.

10. A non-transitory computer-readable medium with instructions stored thereon that, when executed by one or more computers, cause the one or more computers to perform operations, the operations comprising:
identifying original content for an original game;
removing from respective content for a plurality of other games at least one of punctuation, one or more special characters, and emojis to determine corresponding canonical content;
identifying a subset of canonical content from the corresponding canonical content that exceed a threshold similarity as compared to the original content;
associating an original history associated with the original game with the subset of canonical content;
receiving one or more search terms from a user device;
determining a first score based on comparing (1) the original title and the one or more search terms and a second score based on comparing (2) the corresponding canonical titles and the one or more search terms; and
providing a response to the user device, wherein the response includes the original title and one or more of the corresponding canonical titles along with corresponding first scores and corresponding second scores that indicate a level of match between (1) the original title and the one or more search terms and (2) each of the corresponding canonical titles and the one or more search terms, and wherein the original title is provided as a top result and the one or more of the corresponding canonical titles are presented as other results.

11. The computer-readable medium of claim 10, wherein the operations further comprise:
associating a new history with each remaining canonical content that fails to exceed the threshold similarity as compared to the original content.

12. The computer-readable medium of claim 10, wherein the operations further comprise:
generating the original history for the original game, wherein the original history includes at least one of a description of the original game, a creation date of the original game, a number of times the original game was played, an identity of users that played the original game, when the users played the original game, or a thumbnail of the original game.

13. The computer-readable medium of claim 10, wherein the operations further comprise:
identifying a keyword from the respective content and removing the keyword from the respective content, wherein the keyword is descriptive of a holiday.

14. The computer-readable medium of claim 10, wherein the operations further comprise:
identifying a keyword from the respective content and removing the keyword from the respective content, wherein the keyword matches at least one of beta, test, release, edition, or update.

15. The computer-readable medium of claim 10, wherein the original content is an original title, the respective content is respective titles, and canonical content is canonical titles.

16. A system comprising:
one or more processors; and
a memory that stores instructions that, when executed by the one or more processors cause the one or more processors to perform operations comprising:
identifying an original title for an original game;
removing from respective titles for a plurality of other games at least one of punctuation, one or more special characters, and emojis to determine corresponding canonical titles;
identifying a subset of canonical titles from the corresponding canonical titles that exceed a threshold similarity as compared to the original title;
associating an original history associated with the original game with the subset of canonical titles;
receiving one or more search terms from a user device;
determining a first score based on comparing (1) the original title and the one or more search terms and a second score based on comparing (2) the corresponding canonical titles and the one or more search terms; and
providing a response to the user device, wherein the response includes the original title and one or more of the corresponding canonical titles along with corresponding first scores and corresponding second scores that indicate a level of match between (1) the original title and the one or more search terms and (2) each of the corresponding canonical titles and the one or more search terms, and wherein the original title is provided as a top result and the one or more of the corresponding canonical titles are presented as other results.

17. The system of claim 16, wherein the operations further comprise:
associating a new history with each remaining canonical title that fails to exceed the threshold similarity as compared to the original title.

18. The system of claim 16, wherein the operations further comprise:
generating the original history for the original game, wherein the original history includes at least one of a description of the original game, a creation date of the original game, a number of times the original game was played, an identity of users that played the original game, when the users played the original game, or a thumbnail of the original game.

19. The system of claim 16, wherein the operations further comprise:
identifying a keyword from the respective titles and removing the keyword from the respective titles, wherein the keyword is descriptive of a holiday.

20. The system of claim 16, wherein the operations further comprise:
identifying a keyword from the respective titles and removing the keyword from the respective titles, wherein the keyword matches at least one of beta, test, release, edition, or update.

\* \* \* \* \*